US006359638B1

(12) United States Patent
Saeki

(10) Patent No.: US 6,359,638 B1
(45) Date of Patent: Mar. 19, 2002

(54) COLOR ELECTROPHOTOGRAPHIC PRINTER AND FEEDING SPEED CONTROL METHOD THEREFORE FOR ELIMINATING REGISTRATION ERROR IN COLOR SUPERPOSITION

(75) Inventor: Tomoya Saeki, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/713,456

(22) Filed: Nov. 15, 2000

(30) Foreign Application Priority Data

Nov. 16, 1999 (JP) .......................................... 11-325176

(51) Int. Cl.[7] ......................... B41J 2/385; G03G 15/00; G03G 15/01; G01D 15/06

(52) U.S. Cl. ........................ 347/116; 399/167; 399/301

(58) Field of Search .......................... 347/116; 399/178, 399/223, 299, 303, 312, 313, 308, 302, 116, 159, 162, 167, 301

(56) References Cited

U.S. PATENT DOCUMENTS 4,884,105 A * 11/1989 Joseph et al. ............... 399/101
5,671,464 A * 9/1997 Kubota ................... 399/302 X
5,740,492 A * 4/1998 Deki et al. .............. 399/301 X
6,172,696 B1 * 1/2001 Fujikura et al. ........ 399/167 X

FOREIGN PATENT DOCUMENTS

JP 5-103175 4/1993
JP 2745599 2/1998

* cited by examiner

*Primary Examiner*—Susan S. Y. Lee
(74) *Attorney, Agent, or Firm*—Ostrolenk, Faber, Gerb & Soffen, LLP

(57) ABSTRACT

In a color electrophotographic printer, the feeding speed of an image bearing body (image bearing belt, image bearing drum, etc.), an intermediate image transfer body (image transfer belt, image transfer drum, etc.) or a medium feeding body (medium feeding belt, medium feeding drum, etc.) (on which color superposition is conducted) is detected by an encoder pickup wheel. The feeding speed of the image bearing body, the intermediate image transfer body or the medium feeding body is controlled by a control section by means of closed-loop control based on the feeding speed detected by the encoder pickup wheel. The interval L between adjacent exposure units or adjacent development units and the outer diameter D of the encoder pickup wheel are set so as to satisfy the equation: $D=L/n\pi$ (n=1, 2, 3, . . . ). By such a setup, color superposition accuracy can be improved and thereby high quality printing can be realized, without the need of restricting the outer diameter of the image bearing drum, the image transfer drum or the medium feeding drum or the outer diameter of a roller for driving the image bearing belt, the image transfer belt or the medium feeding belt.

18 Claims, 5 Drawing Sheets

COLOR ELECTROPHOTOGRAPHIC PRINTER AND FEEDING SPEED CONTROL METHOD THEREFORE FOR ELIMINATING REGISTRATION ERROR IN COLOR SUPERPOSITION

BACKGROUND OF THE INVENTION

The present invention relates to a color electrophotographic printer having an image bearing body (image bearing belt, image bearing drum, etc.), an intermediate image transfer body (image transfer belt, image transfer drum, etc.) or a medium feeding body (medium feeding belt, medium feeding drum, etc.), and in particular, to a color electrophotographic printer and a feeding speed control method for the color electrophotographic printer by which the feeding speed of the image bearing body, the intermediate image transfer body or the medium feeding body can be controlled appropriately.

DESCRIPTION OF THE RELATED ART

In an electrophotographic printer of a standard type, electrical charges which are remaining on its image bearing body (image bearing belt, image bearing drum etc. on which a latent image is formed by means of exposure) since its previous operation are thoroughly erased by exposure to an eraser lamp. Subsequently, the image bearing body is charged uniformly and evenly by means of corona charger or a charging roll. Thereafter, by irradiating the surface of the image bearing body with laser light or LED (Light-Emitting Diode) light, the electrical charge distribution on the surface is altered and thereby a latent image corresponding to a toner image to be generated is formed on the surface. Toner particles, which are attracted to the electrical charge distribution (latent image) on the surface of the image bearing body, forms a pattern corresponding to the electrical charge distribution and thereby the latent image is developed into a toner image.

In color image development, the formation of the latent image and the development are repeated for each color (yellow, magenta, cyan, black). The developed image is transferred to a medium such as paper, a film, etc. directly or via an intermediate image transfer body (image transfer belt, image transfer drum, etc.).

In the case of the color image development, the superposition of the developed color images (yellow, magenta, cyan, black) is conducted on the image bearing body, on the medium such as paper, a film, etc., or on the intermediate image transfer body.

In such color electrophotographic printers, the accuracy of the superposition of the developed color images not only affects the precision of printing position but also considerably affects color reproduction which is attained by the superposition of yellow, magenta, cyan and black. Therefore, in order to obtain high quality printed outputs, the mechanism or control for the color superposition is of critical importance.

Therefore, some attempts have been made in order to conduct the color superposition accurately and implement high print quality. For example, the interval between exposure units (for generating latent images for each color) or the interval between development units (for generating toner images of each color) is managed and set precisely in the color electrophotographic printer, or registration error in the color superposition is actually detected by conducting test printing and the feeding speed of the image bearing body (, the intermediate image transfer body or the medium feeding body) is corrected and/or activation timing of exposure units are adjusted based on the detected registration error.

As for the constant speed feeding control, techniques by use of control systems employing stepping motors, D.C. servomotors, A.C. servomotors, etc. have been established, and thus such constant speed feeding control can be implemented comparatively easily and at a low cost. However, the cylindrical image bearing body (, the cylindrical intermediate image transfer body or the cylindrical medium feeding body), which is driven by the constant speed feeding control, has errors or variations caused by its manufacturing process. Therefore, the accuracy of the color superposition is necessitated to be deteriorated due to the errors even if the constant speed control of motor rotation is conducted precisely. Also when an image bearing body (, an intermediate image transfer body or a medium feeding body) in the shape of a belt is used, a roller for driving the image bearing body (, the intermediate image transfer body or the medium feeding body) has similar errors or variations due to the manufacturing process, thereby the color superposition accuracy is deteriorated in the same way.

In the case where such errors or variations exist in the image bearing body (, the intermediate image transfer body or the medium feeding body), the feeding speed of the image bearing body (, the intermediate image transfer body or the medium feeding body) changes periodically, therefore, the deterioration of the color superposition accuracy (registration error or misregistration in the color superposition) can be avoided by using the periodicity of the feeding speed.

Such techniques using the periodicity of the feeding speed have been disclosed in Japanese Patent Application Laid-Open No.HEI2-156260 (Japanese Patent No.2745599), Japanese Patent Application Laid-Open No.HEI5-103175, etc.

In Japanese Patent Application Laid-Open No.HEI2-156260, four image generation sections corresponding to yellow, magenta, cyan and black (each of which including a dielectric drum, a charging unit, an electrostatic latent image writing head, a development unit and a cleaner) are placed around a cylindrical medium feeding body (which feeds a medium such as paper on which toner images corresponding to the four colors will be superposed) so as to be in the same phase in the feeding speed periodicity. For example, when the feeding speed of the cylindrical medium feeding body changes N times per revolution, the cycle of the feeding speed variation is $360°/N$ and thus the four image generation sections are placed in positions corresponding to $M\times360°/N$ (M: integer) around the cylindrical medium feeding body. By such positioning of the four image generation sections around the cylindrical medium feeding body (medium feeding drum), the registration error in the color superposition is avoided.

In Japanese Patent Application Laid-Open No.HEI5-103175, the exposure position interval on an image bearing belt (that is, the interval between exposure units for the four colors on the image bearing belt) and the diameter of a drive roller for driving the image bearing belt are set so that the exposure position interval will be a multiple of the circumference of the drive roller ($Lb=K\times\pi D$ (Lb: exposure position interval on the image bearing belt, K: natural number, D: diameter of the drive roller)) for avoiding the misregistration in the color superposition.

However, in the above conventional techniques, the outer diameter of the image bearing drum (, the intermediate image transfer drum or the medium feeding drum) or the outer diameter of the roller for driving the image bearing belt (, the intermediate image transfer belt or the medium feeding belt) is restricted by the exposure position interval or the image transfer position interval (that is, the interval between toner image transfer positions).

The market is requiring miniaturization of the color electrophotographic printers, and thus the internal mechanism and parts of the color electrophotographic printer are also required to be downsized. However, there are limitations in the downsizing of exposure units and development units of the color electrophotographic printers, and thus the reduction of the interval between the exposure units or the development units is also limited.

There is little flexibility in dimensional alteration of the cylindrical image bearing bodies (image bearing drums) since considerable time and cost becomes necessary for constructing production facilities for them. Therefore, there are restrictions both on the interval between the exposure units or the development units and on the outer diameter of the cylindrical image bearing body, therefore, it is difficult to place the exposure units or the development units optimally so as to satisfy a certain relationship as in the conventional techniques.

In the case of the image bearing body in the shape of a belt (image bearing belt), there is flexibility to some extent in the outer diameter of its drive roller, however, from the viewpoint of the endurance of the repeatedly bent image bearing belt on which a photosensitive material is coated, there is also a limit in the downsizing of the drive roller. Therefore, it is also difficult to optimally conduct the miniaturization of the color electrophotographic printer including the image bearing belt satisfying a certain relationship as in the conventional techniques.

SUMMARY OF THE INVENTION

It is therefore the primary object of the present invention to provide a color electrophotographic printer and a feeding speed control method for the color electrophotographic printer by which the color superposition accuracy can be improved and thereby high quality printing can be realized without the need of restricting the outer diameter of the image bearing drum, the intermediate image transfer drum or the medium feeding drum or the outer diameter of the roller for driving the image bearing belt, the intermediate image transfer belt or the medium feeding belt.

In accordance with a first aspect of the present invention, there is provided a color electrophotographic printer in which m (m=2, 3, 4, . . . ) latent images corresponding to m colors are successively formed on an image bearing body by m exposure units corresponding to the m colors by means of irradiation of laser light or LED (Light-Emitting Diode) light and development of each latent image corresponding to each color is conducted just after the formation of the latent image and thereby color superposition of the m colors is conducted on the image bearing body. The color electrophotographic printer comprises an encoder pickup wheel and a control section. The encoder pickup wheel is placed in contact with the image bearing body for detecting the feeding speed of the image bearing body. The outer diameter D of the encoder pickup wheel is set as $D=L/n\pi$ (L: interval between the exposure units, n: natural number). The control section controls the feeding speed of the image bearing body by means of closed-loop control based on the feeding speed detected by the encoder pickup wheel.

In accordance with a second aspect of the present invention, in the first aspect, the image bearing body is implemented by an image bearing belt, and the encoder pickup wheel in contact with the image bearing belt detects the feeding speed of the image bearing belt.

In accordance with a third aspect of the present invention, in the first aspect, the image bearing body is implemented by an image bearing drum, and the encoder pickup wheel in contact with the image bearing drum detects the feeding speed of the image bearing drum.

In accordance with a fourth aspect of the present invention, there is provided a color electrophotographic printer having m (m=2, 3, 4, . . . ) exposure units corresponding to m colors and m development units corresponding to the m exposure units each of which including an image bearing roller on which a latent image is formed by exposure by the corresponding exposure unit and a toner image is formed by development by the corresponding development unit, in which the m toner images formed on the m image bearing rollers respectively are transferred to an intermediate image transfer body and thereby color superposition of the m colors is conducted on the intermediate image transfer body. The color electrophotographic printer comprises an encoder pickup wheel and a control section. The encoder pickup wheel is placed in contact with the intermediate image transfer body for detecting the feeding speed of the intermediate image transfer body. The outer diameter D of the encoder pickup wheel is set as $D=L/n\pi$ (L: interval between the development units, n: natural number). The control section controls the feeding speed of the intermediate image transfer body by means of closed-loop control based on the feeding speed detected by the encoder pickup wheel.

In accordance with a fifth aspect of the present invention, in the fourth aspect, the intermediate image transfer body is implemented by an image transfer belt, and the encoder pickup wheel in contact with the image transfer belt detects the feeding speed of the image transfer belt.

In accordance with a sixth aspect of the present invention, in the fourth aspect, the intermediate image transfer body is implemented by an image transfer drum, and the encoder pickup wheel in contact with the image transfer drum detects the feeding speed of the image transfer drum.

In accordance with a seventh aspect of the present invention, there is provided a color electrophotographic printer having m (m=2, 3, 4, . . . ) exposure units corresponding to m colors and m development units corresponding to the m exposure units each of which including an image bearing roller on which a latent image is formed by exposure by the corresponding exposure unit and a toner image is formed by development by the corresponding development unit, in which the m toner images formed on the m image bearing rollers respectively are transferred to a medium which is fed on a medium feeding body and thereby color superposition of the m colors is conducted on the medium which is fed on the medium feeding body. The color electrophotographic printer comprises an encoder pickup wheel and a control section. The encoder pickup wheel is placed in contact with the medium feeding body for detecting the feeding speed of the medium feeding body. The outer diameter D of the encoder pickup wheel is set as $D=L/n\pi$ (L: interval between the development units, n: natural number). The control section controls the feeding speed of the medium feeding body by means of closed-loop control based on the feeding speed detected by the encoder pickup wheel.

In accordance with an eighth aspect of the present invention, in the seventh aspect, the medium feeding body is implemented by a medium feeding belt, and the encoder pickup wheel in contact with the medium feeding belt detects the feeding speed of the medium feeding belt.

In accordance with a ninth aspect of the present invention, in the seventh aspect, the medium feeding body is implemented by a medium feeding drum, and the encoder pickup wheel in contact with the medium feeding drum detects the feeding speed of the medium feeding drum.

In accordance with a tenth aspect of the present invention, there is provided a feeding speed control method for a color electrophotographic printer in which m (m=2, 3, 4, . . . ) latent images corresponding to m colors are successively formed on an image bearing body by m exposure units corresponding to the m colors by means of irradiation of laser light or LED (Light-Emitting Diode) light and development of each latent image corresponding to each color is conducted just after the formation of the latent image and thereby color superposition of the m colors is conducted on the image bearing body. The feeding speed control method comprises a feeding speed detection step and a feeding speed control step. In the feeding speed detection step, the feeding speed of the image bearing body is detected by an encoder pickup wheel which is placed in contact with the image bearing body and whose outer diameter D is set as $D=L/n\pi$ (L: interval between the exposure units, n: natural number). In the feeding speed control step, the feeding speed of the image bearing body is controlled by a control section by means of closed-loop control based on the feeding speed detected in the feeding speed detection step.

In accordance with an eleventh aspect of the present invention, in the tenth aspect, the image bearing body is implemented by an image bearing belt, and the encoder pickup wheel in contact with the image bearing belt detects the feeding speed of the image bearing belt in the feeding speed detection step.

In accordance with a twelfth aspect of the present invention, in the tenth aspect, the image bearing body is implemented by an image bearing drum, and the encoder pickup wheel in contact with the image bearing drum detects the feeding speed of the image bearing drum in the feeding speed detection step.

In accordance with a thirteenth aspect of the present invention, there is provided a feeding speed control method for a color electrophotographic printer having m (m=2, 3, 4, . . . ) exposure units corresponding to m colors and m development units corresponding to the m exposure units each of which including an image bearing roller on which a latent image is formed by exposure by the corresponding exposure unit and a toner image is formed by development by the corresponding development unit, in which the m toner images formed on the m image bearing rollers respectively are transferred to an intermediate image transfer body and thereby color superposition of the m colors is conducted on the intermediate image transfer body. The feeding speed control method comprises a feeding speed detection step and a feeding speed control step. In the feeding speed detection step, the feeding speed of the intermediate image transfer body is detected by an encoder pickup wheel which is placed in contact with the intermediate image transfer body and whose outer diameter D is set as $D=L/n\pi$ (L: interval between the development units, n: natural number). In the feeding speed control step, the feeding speed of the intermediate image transfer body is controlled by a control section by means of closed-loop control based on the feeding speed detected in the feeding speed detection step.

In accordance with a fourteenth aspect of the present invention, in the thirteenth aspect, the intermediate image transfer body is implemented by an image transfer belt, and the encoder pickup wheel in contact with the image transfer belt detects the feeding speed of the image transfer belt in the feeding speed detection step.

In accordance with a fifteenth aspect of the present invention, in the thirteenth aspect, the intermediate image transfer body is implemented by an image transfer drum and the encoder pickup wheel in contact with the image transfer drum detects the feeding speed of the image transfer drum in the feeding speed detection step.

In accordance with a sixteenth aspect of the present invention, there is provided a feeding speed control method for a color electrophotographic printer having m (m=2, 3, 4, . . . ) exposure units corresponding to m colors and m development units corresponding to the m exposure units each of which including an image bearing roller on which a latent image is formed by exposure by the corresponding exposure unit and a toner image is formed by development by the corresponding development unit, in which the m toner images formed on the m image bearing rollers respectively are transferred to a medium which is fed on a medium feeding body and thereby color superposition of the m colors is conducted on the medium which is fed on the medium feeding body. The feeding speed control method comprises a feeding speed detection step and a feeding speed control step. In the feeding speed detection step, the feeding speed of the medium feeding body is detected by an encoder pickup wheel which is placed in contact with the medium feeding body and whose outer diameter D is set as $D=L/n\pi$ (L: interval between the development units, n: natural number). In the feeding speed control step, the feeding speed of the medium feeding body is controlled by a control section by means of closed-loop control based on the feeding speed detected in the feeding speed detection step.

In accordance with a seventeenth aspect of the present invention, in the sixteenth aspect, the medium feeding body is implemented by a medium feeding belt, and the encoder pickup wheel in contact with the medium feeding belt detects the feeding speed of the medium feeding belt in the feeding speed detection step.

In accordance with an eighteenth aspect of the present invention, in the sixteenth aspect, the medium feeding body is implemented by a medium feeding drum, and the encoder pickup wheel in contact with the medium feeding drum detects the feeding speed of the medium feeding drum in the feeding speed detection step.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
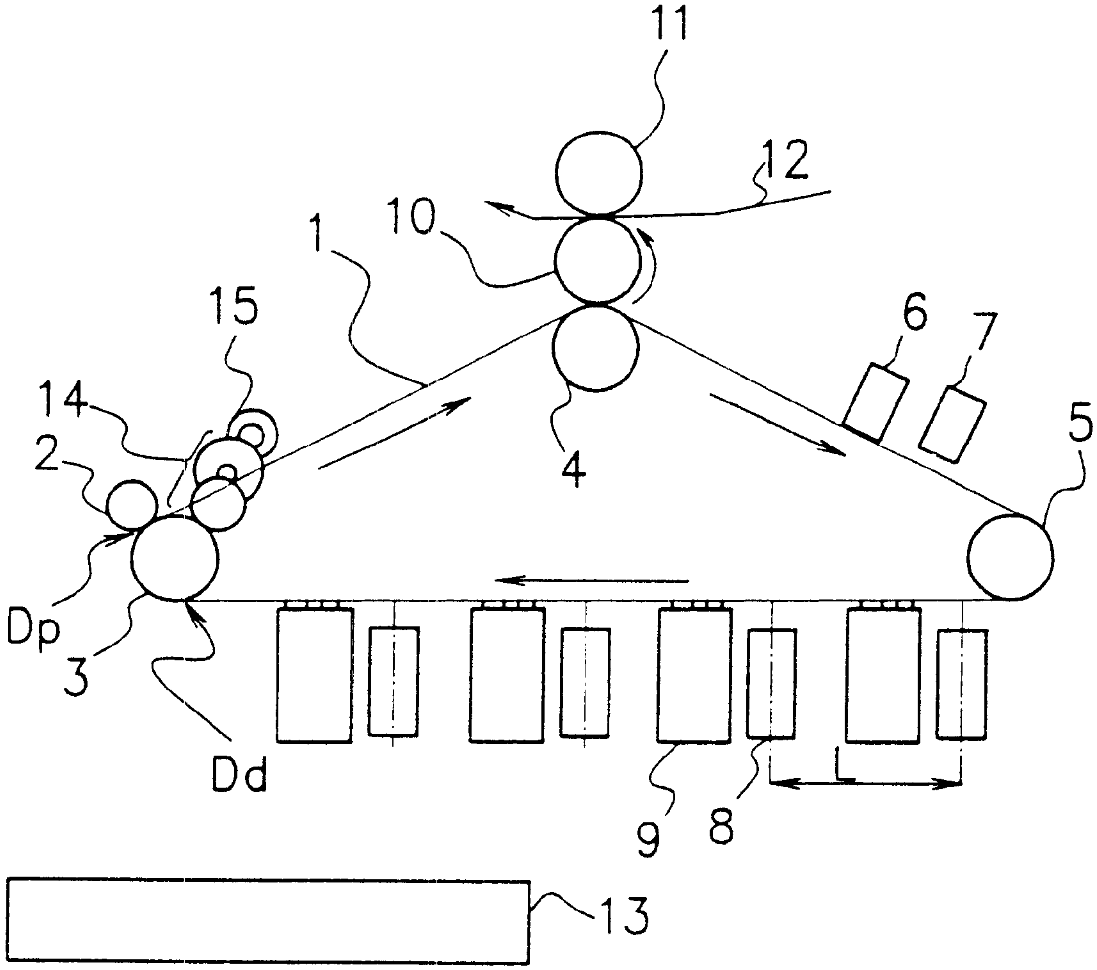
FIG. 1 is a schematic diagram showing a color electrophotographic printer in accordance with a first embodiment of the present invention.

Referring now to the drawings, a description will be given in detail of preferred embodiments in accordance with the present invention.

Figure 2:
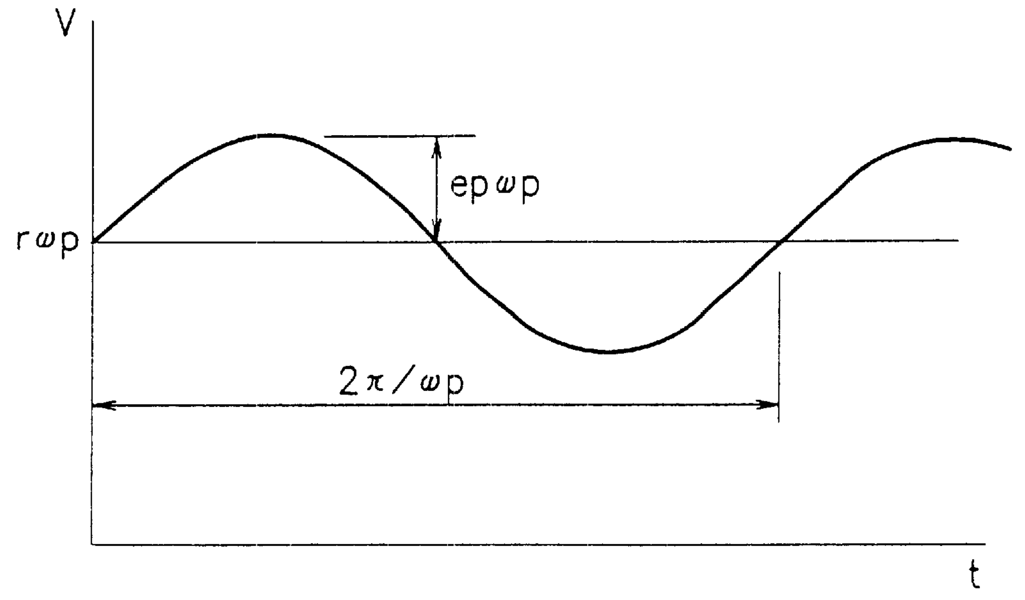
FIG. 2 is a graph showing variations in the feeding speed when an eccentricity (decentering) "ep" exists in an encoder pickup wheel.

FIG. 1 is a schematic diagram showing a color electrophotographic printer in accordance with a first embodiment of the present invention. FIG. 2 is a graph showing variations in the feeding speed when an eccentricity (decentering) "ep" exists in an encoder pickup wheel.

The color electrophotographic printer shown in FIG. 1 includes a drive roller 3, a transfer guide roller 4, a belt tension roller 5 and an image bearing belt 1 which is looped around the drive roller 3, the transfer guide roller 4 and the belt tension roller 5.

The image bearing belt 1 is a belt as an image bearing body on which a latent image (an electrical charge distribution) is formed by exposure and a toner image is formed by development. The drive roller 3 drives the image bearing belt 1. The belt tension roller 5 gives the image bearing belt 1 tension which is necessary for the feeding of the image bearing belt 1.

Between the transfer guide roller 4 and the belt tension roller 5, an eraser unit 6 and a charging unit 7 are placed. The eraser unit 6 erases all the electrical charges which are remaining on the image bearing belt 1 since a previous operation of the color electrophotographic printer by means of exposure. The charging unit 7 changes the surface of the image bearing belt 1 uniformly and evenly.

Between the drive roller 3 and the belt tension roller 5, exposure units 8 and development units 9 corresponding to each color (yellow, magenta, cyan, black) are placed. Each exposure unit 8 irradiates the surface of the image bearing belt 1 with laser light or LED (Light-Emitting Diode) light and alters the electrical charge distribution on the surface and thereby forms a latent image (corresponding to a toner image to be generated) on the surface of the image bearing belt 1. Each development unit 9 applies toner particles to the surface of the image bearing belt 1. The toner particles, which are attracted to the electrical charge distribution (latent image) on the surface of the image bearing belt 1, forms a pattern corresponding to the electrical charge distribution and thereby development of the latent image into a toner image is conducted.

The exposure units 8 for the four colors (yellow, magenta, cyan and black) are placed at even intervals L. If we assume the feeding speed of the image bearing belt 1 is v, timing for the operation of an exposure unit 8 (for a color) is shifted by L/v relative to that of the next exposure unit 8, thereby four images corresponding to the four colors (yellow, magenta, cyan and black) can be formed in the same position on the image bearing belt 1 and thereby the color superposition is realized.

Near the transfer guide roller 4, an image transfer roller 10 and a fixation roller 11 are placed. The image transfer roller 10 is an intermediate image transfer medium to which the toner image formed on the image bearing belt 1 is temporarily transferred. The fixation roller 11 applies heat and pressure to a medium 12 (paper, film, etc.) which is fed between the fixation roller 11 and the image transfer roller 10, thereby the toner image on the image transfer roller 10 is transferred and fused (fixed) onto the medium 12.

The drive roller 3 is engaged with a gear train 14 which is driven by a motor 15. The revolving speed of the motor 15 is reduced by the gear train 14 and the drive roller 3 is driven at the reduced revolving speed. The motor 15 is implemented by a stepping motor or a servomotor having a rotary encoder on its spindle. An encoder pickup wheel 2, which is placed so as to be in contact with the image bearing belt 1, detects the feeding speed of the image bearing belt 1. The feeding speed of the image bearing belt 1 is controlled so as to be constant by means of closed-loop control according to the speed detection by the encoder pickup wheel 2.

In the following, the operation of the color electrophotographic printer of FIG. 1 will be described in detail.

When the interval between adjacent exposure units 8 is set to L0 and the motor 15 drives the image bearing belt 1 so that the angular velocity of the encoder pickup wheel 2 (diameter: Dp) will be ωp, the feeding speed v of the image bearing belt 1 is expressed as:

$$v=r\times\omega p\ (r=Dp/2) \qquad (1).$$

The transit time t0 between adjacent exposure units 8 (interval: L0) is expressed as:

$$t0=L0/v=L0/r/\omega p \qquad (2).$$

By shifting the operation timing of the adjacent exposure units 8 by t0, four images corresponding to the four colors (yellow, magenta, cyan and black) can be formed in the same position on the image bearing belt 1 and thereby the color superposition is realized.

As is clear from the above equation (1), the diameter (Dd) of the drive roller 3 does not affect the feeding speed of the image bearing belt 1.

When the image bearing belt 1 is fed at a constant speed, the angular velocity ωd of the drive roller 3 also becomes constant as:

$$\omega d=(Dp/Dd)\times\omega p \qquad (3).$$

If we assume the feeding speed v changed from v=Dp/2·ωp to (Dd/2+ed)·ωd due to the eccentricity (decentering) of the drive roller 3, the angular velocity ωp of the encoder pickup wheel 2 also changes to:

$$\omega p=(Dp/2)/(Dd/2+ed)\times\omega d \qquad (4).$$

As described above, if the feeding speed of the image bearing belt 1 changed due to the eccentricity of the drive roller 3, the angular velocity ωp of the encoder pickup wheel 2 changes. Therefore, if the change of the angular velocity ωp of the encoder pickup wheel 2 is monitored, the variations in the feeding speed v can be corrected by a control section 13 (shown in FIG. 1) by means of closed-loop control. Therefore, the feeding speed v of the image bearing belt 1 can be maintained constant even if the drive roller 3 has the eccentricity.

However, if the encoder pickup wheel 2 has an eccentricity ep, the feeding speed v of the image bearing belt 1 changes into (Dp/2+ep)×ωp, since the angular velocity ωp of the encoder pickup wheel 2 is controlled to be constant by closed-loop control.

The variations in the feeding speed v in the case where the eccentricity ep of the encoder pickup wheel 2 exists is shown in the graph of FIG. 2.

In such cases, the equation (1) changes into:

$$v=r\omega p+ep\omega p\times\sin(\omega pt) \qquad (5).$$

The total feed distance x(t) of the image bearing belt 1 since t=0 is expressed as:

$$x(t)=\int v\,dt=r\omega pt-ep\times\cos(\omega pt)+C \qquad (6).$$

From the initial condition x(0)=0, the constant C is equal to ep, therefore, the total feed distance x(t) becomes:

$$x(t)=r\omega pt-ep\times\cos(\omega pt)+ep \qquad (6').$$

The distance L(t1, t2) traveled by the image bearing belt 1 during a time interval (t1, t2) (t2>t1>0) can be expressed as:

$$L(t1,\ t2)=x(t2)-x(t1) \qquad (7).$$

Therefore, the distance L(t+t0, t) traveled by the image bearing belt 1 during a transit time t0 since arbitrary time t (t>0) becomes:

$$L(t+t0,\ t)=x(t+t0)-x(t) \qquad (8)$$

$$=r\omega pt0-ep\{\cos[\omega p(t+t0)]-\cos(\omega pt\} \qquad (9).$$

By substituting Eq.(2) into Eq.(9), $$L(t+t0,\ t)=L0-ep\{\cos[\omega p(t+t0)]-\cos(\omega pt)\} \qquad (10).$$

Therefore, even if the feeding speed is controlled appropriately so that the image bearing belt 1 will travel a distance L0 during a transit time t0 from arbitrary time t, a position deviation: $-ep\{\cos[\omega p(t+t0)]-\cos(\omega pt)\}$ occurs due to the eccentricity ep of the encoder pickup wheel 2 as shown in the equation (10). The position deviation causes registration error (misregistration) in the color superposition.

The above registration error can be eliminated if the equation:

$$\cos[\omega p(t+t0)]-\cos(\omega pt)=0 \qquad (11)$$

is satisfied at arbitrary time t. If the equation (11) is satisfied, the travel distance of the image bearing belt 1 during the transit time t0 (time interval for color superposition) from arbitrary time t can constantly be maintained at L0 and the registration error can be avoided even if the feeding speed variation of the equation (5) existed. In order to satisfy the equation (11), the transit time (time interval) to is required to satisfy:

$$t0=2\pi n/\omega p\ (n=1,2,3,\ \ldots\ ) \qquad (12).$$

From the equations (1), (2) and (12), $$L0=2\pi nr=\pi Dpn\ (n=1,2,3,\ \ldots\ ) \qquad (13).$$

Therefore, by setting the interval L0 between adjacent exposure units 8 and the outer diameter Dp of the encoder pickup wheel 2 so as to satisfy the equation (13), the registration error in the color superposition can be eliminated without being affected by the outer diameter Dd of the drive roller 3, the eccentricity ed of the drive roller 3 and the eccentricity ep of the encoder pickup wheel 2.

As described above, in the color electrophotographic printer and the feeding speed control method for the color electrophotographic printer in accordance with the first embodiment of the present invention, the interval L0 between the exposure units 8 (for generating latent images on the image bearing belt 1) and the outer diameter Dp of the encoder pickup wheel 2 are set so as to satisfy the equation (13) and the effects of the outer diameter Dd of the drive roller 3, the eccentricity ed of the drive roller 3 and the eccentricity ep of the encoder pickup wheel 2 are eliminated, thereby the deterioration of the color superposition accuracy due to variations in the feeding speed of the image bearing belt 1 can be avoided and high quality printing can be realized.

Figure 3:
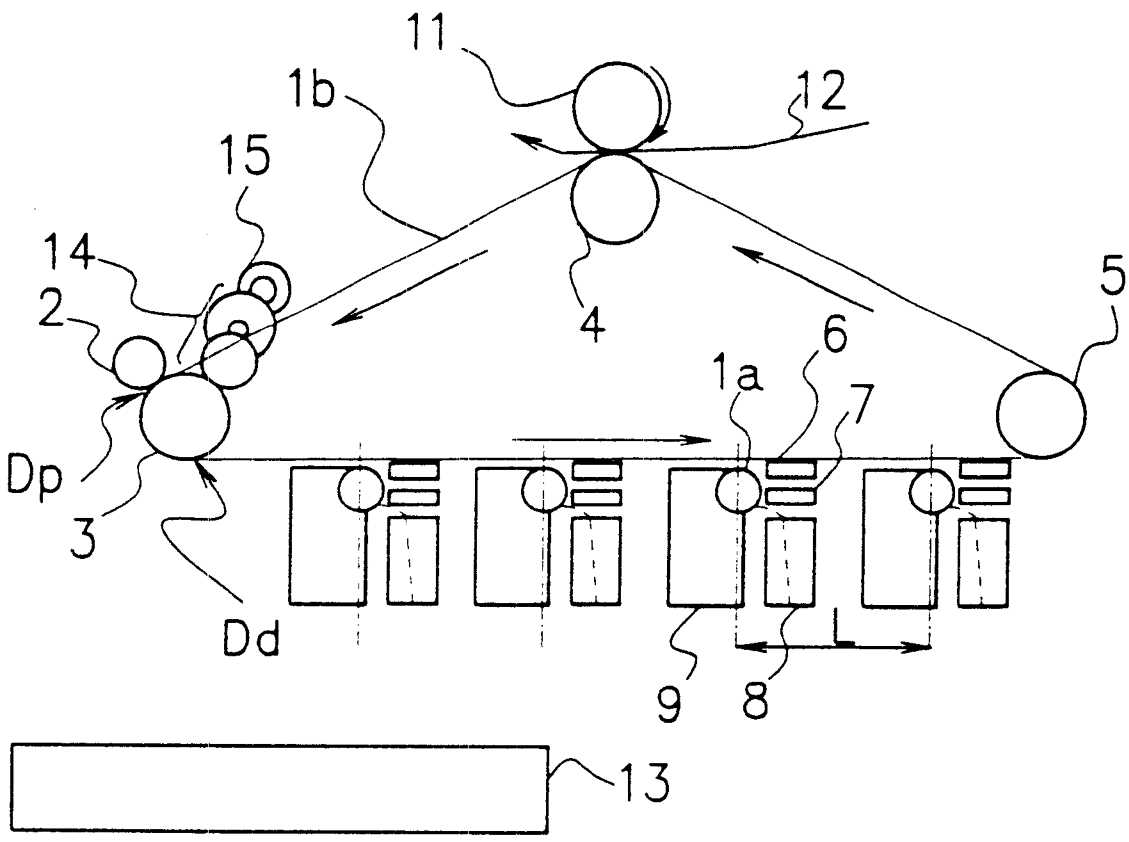
FIG. 3 is a schematic diagram showing a color electrophotographic printer in accordance with a second embodiment of the present invention.

FIG. 3 is a schematic diagram showing a color electrophotographic printer in accordance with a second embodiment of the present invention, in which the same reference characters as those of FIG. 1 designate the same or corresponding parts to those of FIG. 1 and thus repeated description thereof is omitted for brevity.

The color electrophotographic printer show in FIG. 3 has almost the same composition as the color electrophotographic printer of the first embodiment (FIG. 1), however, the image bearing belt 1 of the first embodiment is replaced by an image transfer belt 1*b*. In the second embodiment, each development unit 9 (for each color) is provided with an image bearing roller 1*a*, and each image bearing roller 1*a* is provided with an eraser unit 6 and a charging unit 7.

The printing operation of the color electrophotographic printer of the second embodiment (FIG. 3) is basically the same as that of the first embodiment (FIG. 1), however, in the second embodiment, the latent image and the toner image are formed on the image bearing roller 1*a*, and the toner image is first transferred to the image transfer belt 1*b* and thereafter transferred and fixed onto the medium 12.

In the following, the operation of the color electrophotographic printer of FIG. 3 will be described in detail.

When the interval between adjacent development units 9 is set to L0 and the motor 15 drives the image transfer belt 1*b* so that the angular velocity of the encoder pickup wheel 2 (diameter: Dp) will be ωp, the feeding speed v of the image transfer belt 1*b* is expressed by the aforementioned equation (1). The transit time t0 between adjacent development units 9 (interval: L0) is expressed by the aforementioned equation (2). By shifting the operation timing of the adjacent development units 9 by t0, four images corresponding to the four colors (yellow, magenta, cyan and black) can be formed in the same position on the image transfer belt 1*b* and thereby the color superposition is realized.

As is clear from the above equation (1), the diameter (Dd) of the drive roller 3 does not affect the feeding speed of the image transfer belt 1*b*. When the image transfer belt 1*b* is fed at a constant speed, the angular velocity ωd of the drive roller 3 also becomes constant as the aforementioned equation (3).

If we assume the feeding speed v changed from v=Dp/2·ωp to (Dd/2+ed)·ωd due to the eccentricity (decentering) of the drive roller 3, the angular velocity ωp of the encoder pickup wheel 2 also changes as the aforementioned equation (4).

As described above, the angular velocity ωp of the encoder pickup wheel 2 changes if the feeding speed of the image transfer belt 1*b* changed due to the eccentricity of the drive roller 3. Therefore, by monitoring the change of the angular velocity ωp of the encoder pickup wheel 2, the variations in the feeding speed v can be corrected by the control section 13 (shown in FIG. 3) by means of closed-loop control. Therefore, the feeding speed v of the image transfer belt 1*b* can be maintained constant even if the drive roller 3 has the eccentricity.

However, if the encoder pickup wheel 2 has an eccentricity ep, the feeding speed v of the image transfer belt 1*b* changes into (Dp/2+ep)×ωp, since the angular velocity ωp of the encoder pickup wheel 2 is controlled to be constant by closed-loop control.

In the case where the eccentricity ep of the encoder pickup wheel 2 exists, the feeding speed v changes as has been shown in the graph of FIG. 2. In this case, the feeding speed v of the image transfer belt 1*b* is expressed by the aforementioned equation (5).

Taking the initial condition x(0)=0 into consideration, the total feed distance (total travel distance) x(t) of the image transfer belt 1b since t=0 is expressed by the aforementioned equation (6').

The distance L(t1, t2) traveled by the image transfer belt 1*b* during a time interval (t1, t2) (t2>t1>0) is expressed by the aforementioned equation (7), and the distance L(t+t0, t) traveled by the image transfer belt 1*b* during a transit time t0 since arbitrary time t (t>0) is expressed by the aforementioned equation (10).

Therefore, even if the feeding speed is controlled appropriately so that the image transfer belt 1*b* will travel a distance L0 during a transit time t0 from arbitrary time t, the position deviation: $-ep\{\cos[\omega p(t+t0)]-\cos(\omega pt)\}$ occurs due to the eccentricity ep of the encoder pickup wheel 2 as shown in the equation (10). The position deviation causes the registration error in the color superposition.

The registration error can be eliminated if the aforementioned equation (11) is satisfied at arbitrary time t. If the equation (11) is satisfied, the travel distance of the image transfer belt 1*b* during the transit time t0 (time interval for color superposition) from arbitrary time t can constantly be maintained at L0 and the registration error can be avoided even if the feeding speed variation of the equation (5) existed. In order to satisfy the equation (11), the transit time (time interval) t0 is required to satisfy the aforementioned equation (12), and from the equations (1), (2) and (12), the aforementioned equation (13) is derived.

Therefore, by setting the interval L0 between adjacent development units 9 and the outer diameter Dp of the encoder pickup wheel 2 so as to satisfy the equation (13), the registration error in the color superposition can be eliminated without being affected by the outer diameter Dd of the drive roller 3, the eccentricity ed of the drive roller 3 and the eccentricity ep of the encoder pickup wheel 2.

As described above, in the color electrophotographic printer and the feeding speed control method for the color electrophotographic printer in accordance with the second embodiment of the present invention, the interval L0 between the development units 9 (transferring the toner images to the image transfer belt 1*b* ) and the outer diameter Dp of the encoder pickup wheel 2 are set so as to satisfy the equation (13) and the effects of the outer diameter Dd of the drive roller 3, the eccentricity ed of the drive roller 3 and the eccentricity ep of the encoder pickup wheel 2 are eliminated, thereby the deterioration of the color superposition accuracy due to variations in the feeding speed of the image transfer belt 1*b* can be avoided and high quality printing can be realized.

Incidentally, while the image transfer belt 1*b* (as an intermediate image transfer body) was employed in the above explanation of the second embodiment, the second embodiment can also be applied to cases where a belt as a medium feeding body is employed (that is, cases where the medium 12 such as paper is fed by the medium feeding belt and the toner image generated on the image bearing roller 1*a* is directly transferred to the medium 12 on the medium feeding belt without using an intermediate image transfer body).

Figure 4:
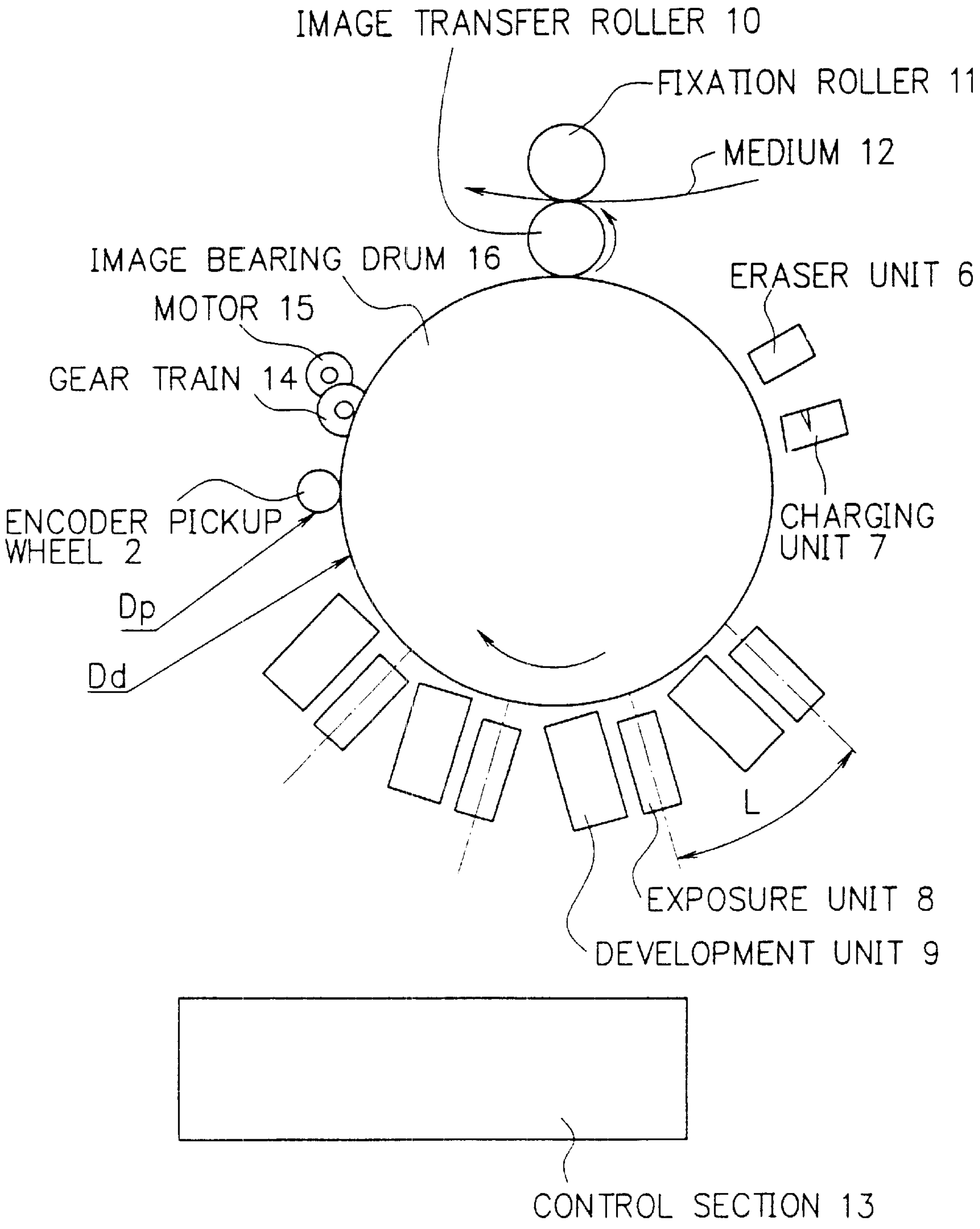
FIG. 4 is a schematic diagram showing a color electrophotographic printer in accordance with a third embodiment of the present invention.

FIG. 4 is a schematic diagram showing a color electrophotographic printer in accordance with a third embodiment of the present invention, in which the same reference characters as those of FIG. 1 designate the same or corresponding parts to those of FIG. 1 and thus repeated description thereof is omitted for brevity.

The color electrophotographic printer show in FIG. 4 has almost the same composition as the color electrophotographic printer of the first embodiment (FIG. 1), however, the image bearing belt 1 of the first embodiment is replaced by an image bearing drum 16 (a cylindrical image bearing body). In the third embodiment, the drive roller 3, the transfer guide roller 4 and the belt tension roller 5 of the first embodiment are omitted since the image bearing drum 16 is used. The other composition is basically the same as that of the first embodiment.

In the following, the operation of the color electrophotographic printer of FIG. 4 will be described in detail.

The exposure units 8 are placed at even intervals L around the image bearing drum 16. If the feeding speed of the image bearing drum 16 is v and the operation timing of the adjacent exposure units 8 is shifted by L/v, four images corresponding to the four colors (yellow, magenta, cyan and black) can be formed in the same position on the image bearing drum 16 and thereby the color superposition is realized.

A toner image formed on the image bearing drum 16 is first transferred to the image transfer roller 10 (as an intermediate image transfer body) and thereafter transferred to the medium 12 (such as paper and films) which is fed between the image transfer roller 10 and the fixation roller 11. At the same time, the toner image on the medium 12 is fixed (fused) on the medium 12 by heat and pressure of the fixation roller 11.

The feeding speed of the image bearing drum 16 is detected by the encoder pickup wheel 2 which is touching the image bearing drum 16 and is controlled so as to be constant by the control section 13 by means of closed-loop control.

When the interval between adjacent exposure units 8 is set to L0 and the motor 15 drives the image bearing drum 16 so that the angular velocity of the encoder pickup wheel 2 (diameter: Dp) will be ωp, the feeding speed v of the image bearing drum 16 is expressed by the aforementioned equation (1). The transit time t0 between adjacent exposure units 8 (interval around the image bearing drum 16: L0) is expressed by the aforementioned equation (2). By shifting the operation timing of the adjacent exposure units 8 by t0, four images corresponding to the four colors are formed in the same position on the image bearing drum 16 and thereby the color superposition is realized.

As is clear from the above equation (1), the diameter (Dd) of the image bearing drum 16 does not affect the feeding speed of the image bearing drum 16. When the image bearing drum 16 is fed at a constant speed, the angular velocity 107 d of the image bearing drum 16 becomes constant as the aforementioned equation (3).

If we assume the feeding speed v changed from $v=Dp/2\cdot\omega p$ to $(Dd/2+ed)\cdot\omega d$ due to the eccentricity (decentering) of the image bearing drum 16, the angular velocity ωp of the encoder pickup wheel 2 also changes as the aforementioned equation (4).

As described above, the angular velocity ωp of the encoder pickup wheel 2 changes if the feeding speed of the image bearing drum 16 changed due to the eccentricity of the image bearing drum 16. Therefore, by monitoring the change of the angular velocity ωp of the encoder pickup wheel 2, the variations in the feeding speed v can be corrected by the control section 13 (shown in FIG. 4) by means of closed-loop control. Therefore, the feeding speed v of the image bearing drum 16 can be maintained constant even if the image bearing drum 16 has the eccentricity.

However, if the encoder pickup wheel 2 has an eccentricity ep, the feeding speed v of the image bearing drum 16 changes into $(Dp/2+ep)\times\omega p$, since the angular velocity $\omega p$ of the encoder pickup wheel 2 is controlled to be constant by closed-loop control.

In the case where the eccentricity ep of the encoder pickup wheel 2 exists, the feeding speed v changes as has been shown in the graph of FIG. 2. In this case, the feeding speed v of the image bearing drum 16 is expressed by the aforementioned equation (5).

Taking the initial condition x(0)=0 into consideration, the total feed distance (total travel distance) x(t) of (the outer edge of) the image bearing drum 16 since t=0 is expressed by the aforementioned equation (6').

The distance L(t1, t2) traveled by (the outer edge of) the image bearing drum 16 during a time interval (t1, t2) (t2>t1>0) is expressed by the aforementioned equation (7), and the distance L(t+t0, t) traveled by (the outer edge of) the image bearing drum 16 during a transit time, t0 since arbitrary time t (t>0) is expressed by the aforementioned equation (10).

Therefore, even if the feeding speed is controlled appropriately so that (the outer edge of) the image bearing drum 16 will travel a distance L0 during a transit time t0 from arbitrary time t, the position deviation: $-ep\{\cos[\omega p(t+t0)]-\cos(\omega pt)\}$ occurs due to the eccentricity ep of the encoder pickup wheel 2 as shown in the equation (10). The position deviation causes the registration error in the color superposition.

The registration error can be eliminated if the aforementioned equation (11) is satisfied at arbitrary time t. If the equation (11) is satisfied, the travel distance of the image bearing drum 16 during the transit time t0 (time interval for color superposition) from arbitrary time t can constantly be maintained at L0 and the registration error can be avoided even if the feeding speed variation of the equation (5) existed. In order to satisfy the equation (11), the transit time (time interval) t0 is required to satisfy the aforementioned equation (12), and from the equations (1), (2) and (12), the aforementioned equation (13) is derived.

Therefore, by setting the interval L0 between adjacent exposure units 8 and the outer diameter Dp of the encoder pickup wheel 2 so as to satisfy the equation (13), the registration error in the color superposition can be eliminated without being affected by the outer diameter Dd of the image bearing drum 16, the eccentricity ed of the image bearing drum 16 and the eccentricity ep of the encoder pickup wheel 2.

As described above, in the color electrophotographic printer and the feeding speed control method for the color electrophotographic printer in accordance with the third embodiment of the present invention, the interval L0 between the exposure units 8 (for generating latent images on the image bearing drum 16) and the outer diameter Dp of the encoder pickup wheel 2 are set so as to satisfy the equation (13) and the effects of the outer diameter Dd of the image bearing drum 16, the eccentricity ed of the image bearing drum 16 and the eccentricity ep of the encoder pickup wheel 2 are eliminated, thereby the deterioration of the color superposition accuracy due to variations in the feeding speed of the image bearing drum 16 can be avoided and high quality printing can be realized.

Figure 5:
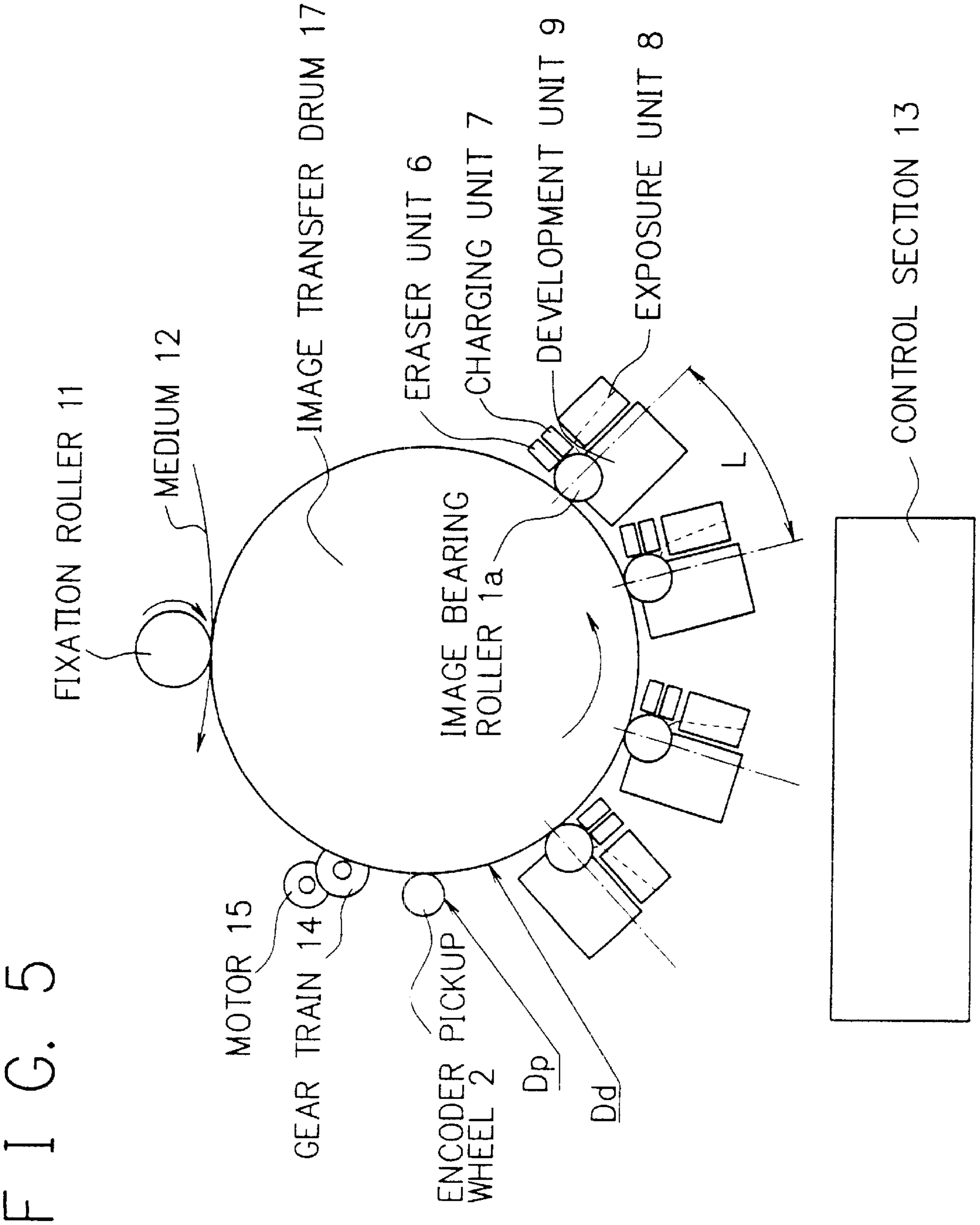
FIG. 5 is a schematic diagram showing a color electrophotographic printer in accordance with a fourth embodiment of the present invention.

FIG. 5 is a schematic diagram showing a color electrophotographic printer in accordance with a fourth embodiment of the present invention, in which the same reference characters as those of FIG. 1 designate the same or corresponding parts to those of FIG. 1 and thus repeated description thereof is omitted for brevity.

The color electrophotographic printer show in FIG. 5 has almost the same composition as the color electrophotographic printer of the third embodiment (FIG. 4), however, the image bearing drum 16 of the third embodiment is replaced by an image transfer drum 17. In the fourth embodiment, each development unit 9 (for each color) is provided with an image bearing roller 1*a*, and each image bearing roller 1*a* is provided with an eraser unit 6 and a charging unit 7.

The printing operation of the color electrophotographic printer of the fourth embodiment (FIG. 5) is basically the same as that of the third embodiment (FIG. 4), however, in the fourth embodiment, the latent image and the toner image are formed on the image bearing roller 1*a*, and the toner image is first transferred to the image transfer drum 17 and thereafter transferred and fixed onto the medium 12.

In the following, the operation of the color electrophotographic printer of FIG. 5 will be described in detail.

The development units 9 are placed at even intervals L around the image transfer drum 17. If the feeding speed of the image transfer drum 17 is v and the operation timing of the development units 9 is shifted by L/v, four images corresponding to the four colors (yellow, magenta, cyan and black) can be formed in the same position on the image transfer drum 17 and thereby the color superposition is realized.

A toner image formed on the image bearing roller 1*a* is first transferred to the image transfer drum 17 (as an intermediate image transfer body) and thereafter transferred to the medium 12 (such as paper and films) which is fed between the image transfer drum 17 and the fixation roller 11. At the same time, the toner image on the medium 12 is fixed (fused) on the medium 12 by heat and pressure of the fixation roller 11.

The feeding speed of the image transfer drum 17 is detected by the encoder pickup wheel 2 which is touching the image transfer drum 17 and is controlled so as to be constant by the control section 13 by means of closed-loop control.

When the interval between adjacent development units 9 is set to L0 and the motor 15 drives the image transfer drum 17 so that the angular velocity of the encoder pickup wheel 2 (diameter: Dp) will be $\omega p$, the feeding speed v of the image transfer drum 17 is expressed by the aforementioned equation (1). The transit time t0 between adjacent development units 9 (interval around the image transfer drum 17: L0) is expressed by the aforementioned equation (2). By shifting the operation timing of the adjacent development units 9 by t0, four images corresponding to the four colors are formed in the same position on the image transfer drum 17 and thereby the color superposition is realized.

As is clear from the above equation (1), the diameter (Dd) of the image transfer drum 17 does not affect the feeding speed of the image transfer drum 17. When the image transfer drum 17 is fed at a constant speed, the angular velocity $\omega d$ of the image transfer drum 17 becomes constant as the aforementioned equation (3).

If we assume the feeding speed v changed from $v=Dp/2\cdot\omega p$ to $(Dd/2+ed)\cdot\omega d$ due to the eccentricity (decentering) of the image transfer drum 17, the angular velocity $\omega p$ of the encoder pickup wheel 2 also changes as the aforementioned equation (4).

As described above, the angular velocity $\omega p$ of the encoder pickup wheel 2 changes if the feeding speed of the image transfer drum 17 changed due to the eccentricity of the image transfer drum 17. Therefore, by monitoring the change of the angular velocity $\omega p$ of the encoder pickup wheel 2, the variations in the feeding speed v can be corrected by the control section 13 (shown in FIG. 5) by means of closed-loop control. Therefore, the feeding speed v of the image transfer drum 17 can be maintained constant even if the image transfer drum 17 has the eccentricity.

However, if the encoder pickup wheel 2 has an eccentricity ep, the feeding speed v of the image transfer drum 17 changes into (Dp/2+ep)×ωp, since the angular velocity ωp of the encoder pickup wheel 2 is controlled to be constant by closed-loop control.

In the case where the eccentricity ep of the encoder pickup wheel 2 exists, the feeding speed v changes as has been shown in the graph of FIG. 2. In this case, the feeding speed v of the image transfer drum 17 is expressed by the aforementioned equation (5).

Taking the initial condition x(0)=0 into consideration, the total feed distance (total travel distance) x(t) of (the outer edge of) the image transfer drum 17 since t=0 is expressed by the aforementioned equation (6').

The distance L(t1, t2) traveled by (the outer edge of) the image transfer drum 17 during a time interval (t1, t2) (t2>t1>0) is expressed by the aforementioned equation (7), and the distance L(t+t0, t) traveled by (the outer edge of) the image transfer drum 17 during a transit time t0 since arbitrary time t (t>0) is expressed by the aforementioned equation (10).

Therefore, even if the feeding speed is controlled appropriately so that (the outer edge of) the image transfer drum 17 will travel a distance L0 during a transit time t0 from arbitrary time t, the position deviation: −ep{cos[ωp(t+t0)]−cos(ωpt)} occurs due to the eccentricity ep of the encoder pickup wheel 2 as shown in the equation (10). The position deviation causes the registration error in the color superposition.

The registration error can be eliminated if the aforementioned equation (11) is satisfied at arbitrary time t. If the equation (11) is satisfied, the travel distance of the image transfer drum 17 during the transit time t0 (time interval for color superposition) from arbitrary time t can constantly be maintained at L0 and the registration error can be avoided even if the feeding speed variation of the equation (5) existed. In order to satisfy the equation (11), the transit time (time interval) t0 is required to satisfy the aforementioned equation (12), and from the equations (1), (2) and (12), the aforementioned equation (13) is derived.

Therefore, by setting the interval L0 between adjacent development units 9 and the outer diameter Dp of the encoder pickup wheel 2 so as to satisfy the equation (13), the registration error in the color superposition can be eliminated without being affected by the outer diameter Dd of the image transfer drum 17, the eccentricity ed of the image transfer drum 17 and the eccentricity ep of the encoder pickup wheel 2.

As described above, in the color electrophotographic printer and the feeding speed control method for the color electrophotographic printer in accordance with the fourth embodiment of the present invention, the interval L0 between the development units 9 (transferring the toner images to the image transfer drum 17) and the outer diameter Dp of the encoder pickup wheel 2 are set so as to satisfy the equation (13) and the effects of the outer diameter Dd of the image transfer drum 17, the eccentricity ed of the image transfer drum 17 and the eccentricity ep of the encoder pickup wheel 2 are eliminated, thereby the deterioration of the color superposition accuracy due to variations in the feeding speed of the image transfer drum 17 can be avoided and high quality printing can be realized.

Incidentally, while the image transfer drum 17 (as an intermediate image transfer body) was employed in the above explanation of the fourth embodiment, the fourth embodiment can also be applied to cases where a drum as a medium feeding body is employed (that is, cases where the medium 12 such as paper is fed by the medium feeding drum and the toner image generated on the image bearing roller 1*a* is directly transferred to the medium 12 on the medium feeding drum without using an intermediate image transfer body).

As set forth hereinabove, in the color electrophotographic printer and the feeding speed control method for the color electrophotographic printer in accordance with the present invention, the feeding speed of the image bearing body, the intermediate image transfer body or the medium feeding body (on which color superposition is conducted) in the shape of a belt or a cylinder is detected by the encoder pickup wheel 2, and the feeding speed of the image bearing body, the intermediate image transfer body or the medium feeding body is controlled by the feedback of the control section 13 by means of closed-loop control based on the feeding speed detected by the encoder pickup wheel 2. The interval L between adjacent exposure units 8 or adjacent development units 9 and the outer diameter D of the encoder pickup wheel 2 are set so as to satisfy the equation: D=L/nπ (n=1, 2, 3, . . . ). By such a setup, the color superposition accuracy can be improved and thereby high quality printing can be realized without the need of restricting the outer diameter of the image bearing drum, the intermediate image transfer drum or the medium feeding drum or the outer diameter of the roller for driving the image bearing belt, the intermediate image transfer belt or the medium feeding belt.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A color electrophotographic printer in which m (m=2, 3, 4, . . . ) latent images corresponding to m colors are successively formed on an image bearing body by m exposure units corresponding to the m colors by means of irradiation of laser light or LED (Light-Emitting Diode) light and development of each latent image corresponding to each color is conducted just after the formation of the latent image and thereby color superposition of the m colors is conducted on the image bearing body, comprising:

an encoder pickup wheel which is placed in contact with the image bearing body for detecting the feeding speed of the image bearing body and whose outer diameter D is set as D=L/nπ (L: interval between the exposure units, n: natural number); and a control section for controlling the feeding speed of the image bearing body by means of closed-loop control based on the feeding speed detected by the encoder pickup wheel.

2. A color electrophotographic printer as claimed in claim 1, wherein the image bearing body is an image bearing belt and the encoder pickup wheel in contact with the image bearing belt detects the feeding speed of the image bearing belt.

3. A color electrophotographic printer as claimed in claim 1, wherein the image bearing body is an image bearing drum and the encoder pickup wheel in contact with the image bearing drum detects the feeding speed of the image bearing drum.

4. A color electrophotographic printer having m (m=2, 3, 4, . . . ) exposure units corresponding to m colors and m development units corresponding to the m exposure units each of which including an image bearing roller on which a latent image is formed by exposure by the corresponding exposure unit and a toner image is formed by development by the corresponding development unit, in which the m toner images formed on the m image bearing rollers respectively are transferred to an intermediate image transfer body and thereby color superposition of the m colors is conducted on the intermediate image transfer body, comprising:

an encoder pickup wheel which is placed in contact with the intermediate image transfer body for detecting the feeding speed of the intermediate image transfer body and whose outer diameter D is set as D =L/nπ (L: interval between the development units, n: natural number); and a control section for controlling the feeding speed of the intermediate image transfer body by means of closed-loop control based on the feeding speed detected by the encoder pickup wheel.

5. A color electrophotographic printer as claimed in claim 4, wherein the intermediate image transfer body is an image transfer belt and the encoder pickup wheel in contact with the image transfer belt detects the feeding speed of the image transfer belt.

6. A color electrophotographic printer as claimed in claim 4, wherein the intermediate image transfer body is an image transfer drum and the encoder pickup wheel in contact with the image transfer drum detects the feeding speed of the image transfer drum.

7. A color electrophotographic printer having m (m=2, 3, 4, . . . , exposure units corresponding to m colors and m development units corresponding to the m exposure units each of which including an image bearing roller on which a latent image is formed by exposure by the corresponding exposure unit and a toner image is formed by development by the corresponding development unit, in which the m toner images formed on the m image bearing rollers respectively are transferred to a medium which is fed on a medium feeding body and thereby color superposition of the m colors is conducted on the medium which is fed on the medium feeding body, comprising:

an encoder pickup wheel which is placed in contact with the medium feeding body for detecting the feeding speed of the medium feeding body and whose outer diameter D is set as D=L/nπ (L: interval between the development units, n: natural number); and a control section for controlling the feeding speed of the medium feeding body by means of closed-loop control based on the feeding speed detected by the encoder pickup wheel.

8. A color electrophotographic printer as claimed in claim 7, wherein the medium feeding body is a medium feeding belt and the encoder pickup wheel in contact with the medium feeding belt detects the feeding speed of the medium feeding belt.

9. A color electrophotographic printer as claimed in claim 7, wherein the medium feeding body is a medium feeding drum and the encoder pickup wheel in contact with the medium feeding drum detects the feeding speed of the medium feeding drum.

10. A feeding speed control method for a color electrophotographic printer in which m (m=2, 3, 4, . . . ) latent images corresponding to m colors are successively formed on an image bearing body by m exposure units corresponding to the m colors by means of irradiation of laser light or LED (Light-Emitting Diode) light and development of each latent image corresponding to each color is conducted just after the formation of the latent image and thereby color superposition of the m colors is conducted on the image bearing body, comprising the steps of:

a feeding speed detection step in which the feeding speed of the image bearing body is detected by an encoder pickup wheel which is placed in contact with the image bearing body and whose outer diameter D is set as D=L/nπ (L: interval between the exposure units, n: natural number); and a feeding speed control step in which the feeding speed of the image bearing body is controlled by a control section by means of closed-loop control based on the feeding speed detected in the feeding speed detection step.

11. A feeding speed control method for a color electrophotographic printer as claimed in claim 10, wherein the image bearing body is an image bearing belt and the encoder pickup wheel in contact with the image bearing belt detects the feeding speed of the image bearing belt in the feeding speed detection step.

12. A feeding speed control method for a color electrophotographic printer as claimed in claim 10, wherein the image bearing body is an image bearing drum and the encoder pickup wheel in contact with the image bearing drum detects the feeding speed of the image bearing drum in the feeding speed detection step.

13. A feeding speed control method for a color electrophotographic printer having m (m=2, 3, 4, . . . ) exposure units corresponding to m colors and m development units corresponding to the m exposure units each of which including an image bearing roller on which a latent image is formed by exposure by the corresponding exposure unit and a toner image is formed by development by the corresponding development unit, in which the m toner images formed on the m image bearing rollers respectively are transferred to an intermediate image transfer body and thereby color superposition of the m colors is conducted on the intermediate image transfer body, comprising the steps of:

a feeding speed detection step in which the feeding speed of the intermediate image transfer body is detected by an encoder pickup wheel which is placed in contact with the intermediate image transfer body and whose outer diameter D is set as D=L/nπ (L: interval between the development units, n: natural number); and a feeding speed control step in which the feeding speed of the intermediate image transfer body is controlled by a control section by means of closed-loop control based on the feeding speed detected in the feeding speed detection step.

14. A feeding speed control method for a color electrophotographic printer as claimed in claim 13, wherein the intermediate image transfer body is an image transfer belt and the encoder pickup wheel in contact with the image transfer belt detects the feeding speed of the image transfer belt in the feeding speed detection step.

15. A feeding speed control method for a color electrophotographic printer as claimed in claim 13, wherein the intermediate image transfer body is an image transfer drum and the encoder pickup wheel in contact with the image transfer drum detects the feeding speed of the image transfer drum in the feeding speed detection step.

16. A feeding speed control method for a color electrophotographic printer having m (m=2, 3, 4, . . . ) exposure units corresponding to m colors and m development units corresponding to the m exposure units each of which including an image bearing roller on which a latent image is formed by exposure by the corresponding exposure unit and a toner image is formed by development by the corresponding development unit, in which the m toner images formed on the m image bearing rollers respectively are transferred to a medium which is fed on a medium feeding body and thereby color superposition of the m colors is conducted on the medium which is fed on the medium feeding body, comprising the steps of:

a feeding speed detection step in which the feeding speed of the medium feeding body is detected by an encoder pickup wheel which is placed in contact with the medium feeding body and whose outer diameter D is set as $D=L/n\pi$ (L: interval between the development units, n: natural number); and a feeding speed control step in which the feeding speed of the medium feeding body is controlled by a control section by means of closed-loop control based on the feeding speed detected in the feeding speed detection step.

17. A feeding speed control method for a color electrophotographic printer as claimed in claim 16, wherein the medium feeding body is a medium feeding belt and the encoder pickup wheel in contact with the medium feeding belt detects the feeding speed of the medium feeding belt in the feeding speed detection step.

18. A feeding speed control method for a color electrophotographic printer as claimed in claim 16, wherein the medium feeding body is a medium feeding drum and the encoder pickup wheel in contact with the medium feeding drum detects the feeding speed of the medium feeding drum in the feeding speed detection step.

* * * * *